July 12, 1960

C. C. BARNETT ET AL 2,944,542

DETECTING AND RECORDING PHYSIOLOGICAL
CHANGES ACCOMPANYING EMOTION STRESSES

Filed Oct. 3, 1955

INVENTOR.
Claude C. Barnett
Homer J. Dana
BY
*Frank Wells*
Atty.

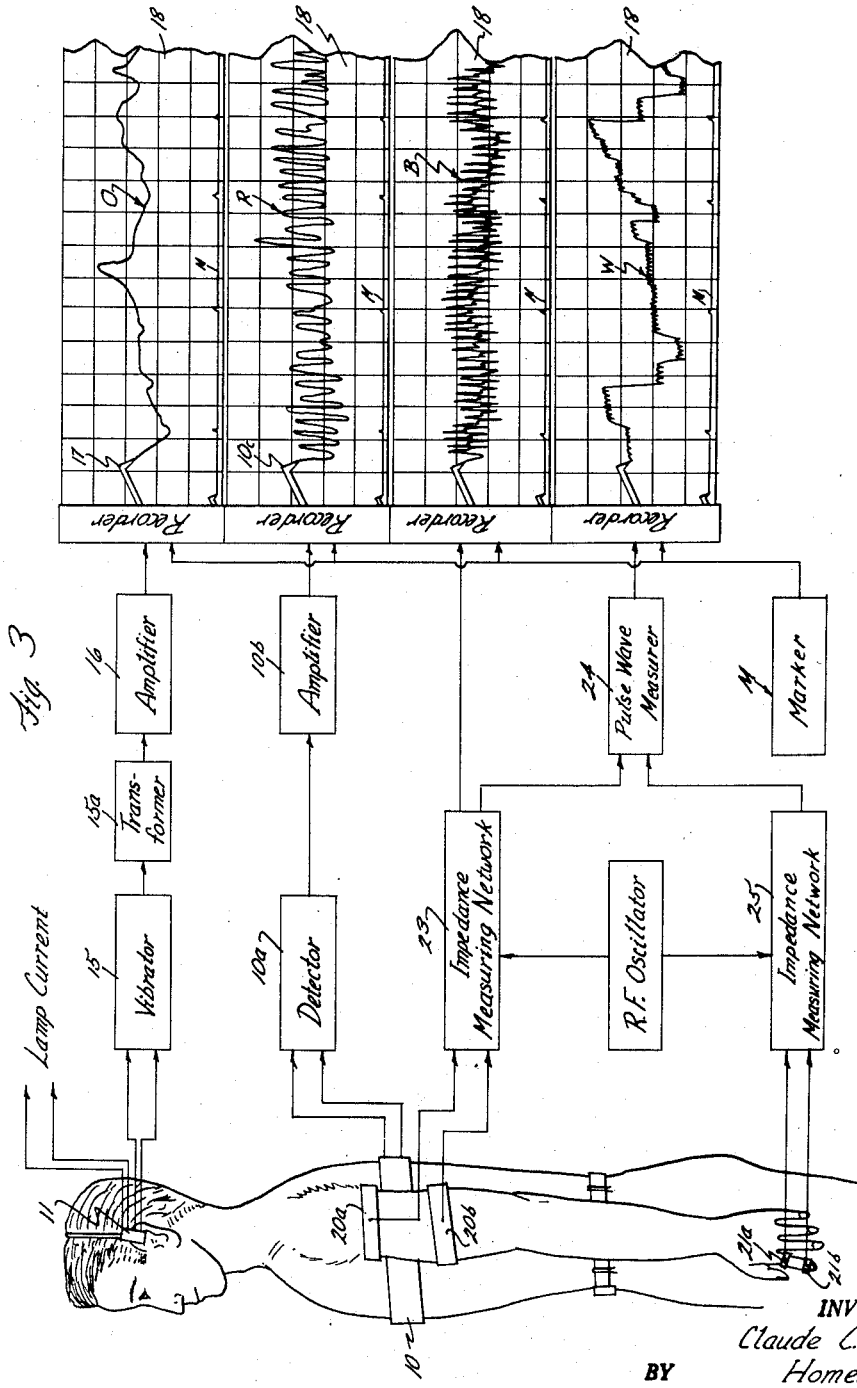

July 12, 1960 C. C. BARNETT ET AL 2,944,542
DETECTING AND RECORDING PHYSIOLOGICAL
CHANGES ACCOMPANYING EMOTION STRESSES
Filed Oct. 3, 1955 4 Sheets-Sheet 3
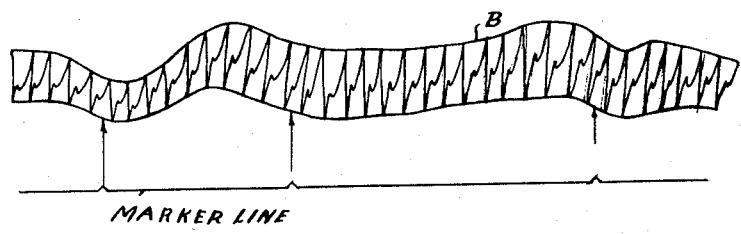
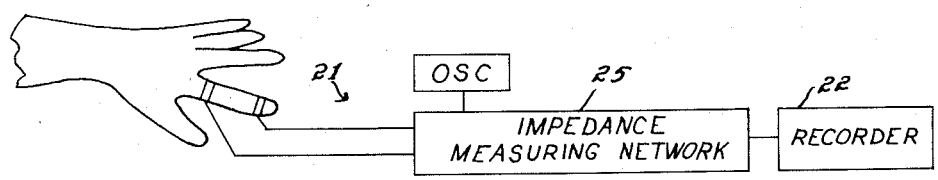
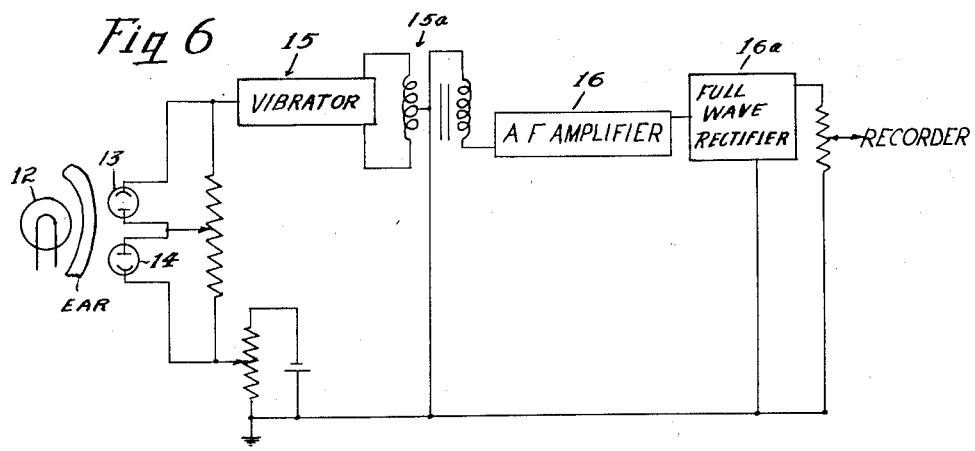
INVENTOR.
Claude C. Barnett
Homer J. Dana
BY
Atty.

INVENTORS.
Claude C. Barnett
Homer J. Dana
BY
Gruhl Wells
Atty.

United States Patent Office 2,944,542
Patented July 12, 1960

2,944,542

DETECTING AND RECORDING PHYSIOLOGICAL CHANGES ACCOMPANYING EMOTION STRESSES

Claude C. Barnett and Homer J. Dana, Pullman, Wash., assignors, by mesne assignments, to Research Corporation, New York, N.Y., a corporation of New York Filed Oct. 3, 1955, Ser. No. 538,154

1 Claim. (Cl. 128—2.05)

Our invention relates to the detecting and recording of physiological changes accompanying emotional stresses.

Emotional stress, regardless of how it is induced, or to what degree, is accompanied by some measurable physiological change in the individual concerned. Emotional stress is by no means confined to individuals who are attempting to deceive, although in the past most of the publicity in this field has been concerning instruments for detecting deception. Instruments for detecting and measuring physiological changes that accompany emotional stress are well known under the commonly used term of lie detectors. An example of such an instrument is the one developed by Dr. John A. Larsen and used in the early 1920's by Police Chief August Vollmer of Berkeley, California. It consisted of a blood pressure cuff and a respiration belt, both suitably coupled to recording pens traversing a record chart. Such instruments are often called polygraphs. Other instruments have been developed for measuring and recording variations in resistance or potential between two points on the skin of a person. See for example, the patent to Eilenberger, No. 2,379,955, and the patent to Wilhelm, No. 2,535,249. Various other devices for detecting and measuring physiological changes in the body have been developed. However, the polygraph using blood pressure and respiration changes has continued to be the popular system for detecting physiological changes accompanying emotional stress.

It is a purpose of our invention to provide an improved system of detecting and recording physiological changes in a subject under examination which makes it possible to bring changes in oxygen content of the blood and pulse wave velocity into the record of physiological change and relate them to the changes in respiration and blood pressure in such a manner as to provide a more accurate indication of the physiological changes occurring in response to emotional stress and the extent thereof.

It is known that individuals can, to a certain degree, control their respiration. Other features of the polygraph as generally used may make its indications misleading. For example, the discomfort of a blood pressure cuff in itself is a diverting factor. The adjustment of the cuff and the necessity for releasing it frequently interrupt the test. Also change in temperature of the arm of the subject, when it is covered by the cuff, may change the recorded reading, thus possibly indicating emotional stress that is not actually present.

One purpose of the present invention is to provide means whereby the errors that may come from the blood pressure cuff reading may be overcome by providing a separate, different blood pressure indication which is obtained without added discomfort to the subject in connection with the pulse wave velocity measurement.

It is a further purpose of our invention to provide a system whereby the relation between breathing rate and oxygen concentration in the blood is made evident on the recording mechanism. When a subject experiences even a mild emotional stress there results a change in the body requirements for oxygen. This change in oxygen requirement does not appear to be under his control. Any change in the oxygen content of the blood results in a change in the color of the blood which can be detected and indicated by a suitable color-sensitive instrument such as an oxyhemograph. Bringing in more oxygen by breathing can satisfy a demand for the subject for more oxygen. Where emotional stress causes a changed demand for oxygen and the breathing does not satisfy the demand, the resultant color change in the blood is more pronounced. Thus by combining the blood oxygen indication with the respiration indication, the presence of emotional stress is revealed even though the respiratory indication may be controlled by the subject through conscious effort.

Another purpose of our invention is to provide a system whereby the pulse waves that travel along the arteries in response to heart action, are made evident and related to the oxygen content, respiratory and blood pressure indications. There are a plurality of types of pulse wave velocity variations. There are three types of blood pressure changes that occur at any segment of the body. First there is the blood pressure change accompanying each heart beat. Second, there are slower blood pressure changes occurring over a plurality of heart beats, and third there are very slow blood pressure changes which occur over a period of several minutes.

The pulse wave velocities appear to be at least of three types. First, there are gross variations which are changes in average velocity. Second, there are smaller rhythmic variations due apparently to cross coupling between the respiratory and the heart nerve centers. Third, there are specific variations that are associated with emotional stress. The velocity of this composite pulse wave depends, in part, upon the diameter and elasticity of the blood vessels. Furthermore, it has been found that even mild emotional stresses cause a change in these blood vessels with resulting changes in pulse wave velocity.

Characteristics of the change in pulse wave velocity are: first, its high sensitivity to changes in emotional stress; second, its large percentage change; and third, its relative stability. Even small emotional responses cause changes in the diameter and elasticity of blood vessels which in turn affect the velocity at which a pulse wave travels away from the heart.

In order to accomplish measurement and indication of pulse wave velocity coincident with indications of blood pressure, we employ two electrical plethysmographs which are attached to some segment of the body, one being farther from the heart than the other. The electrical plethysmograph operates upon a very simple principle. The electrical impedance of a segment of the body depends in part upon the volume of blood it contains. This volume in turn is affected by the blood pressure and by the tension of the blood vessel walls. Any change in pressure, or tension, or both, will change the electrical impedance and this change can be measured easily. Thus the electrical plethysmograph can be used to supply the desired information obtained from a blood pressure cuff, that is, changes in blood pressure. The two plethysmographs are applied to a finger of a subject and to the arm that carries that finger. In this way blood pressure changes and pulse wave velocity changes are obtained simultaneously with respiratory changes and changes in the oxygen content of the blood. The blood pressure cuff may be used also to check the plethysmograph readings, if desired. However, the plethysmograph may be used with so little discomfort and without critical adjustment that need for the blood pressure cuff is not apparent.

Having outlined generally the nature and purpose of our invention, it is believed that a specific example of the method and the details of the apparatus employed therewith will enable one skilled in the art to practice the invention. It should be understood, however, that this example is illustrative only, and that changes in the parts employed and their relations may be made without departing from the scope of the invention as defined hereinafter by the claim.

The accompanying drawings illustrate diagrammatically the recordings obtained and details of the electrical circuits essential to the operation of the system.

In the drawings:

Figure 3 is a diagram showing the several records taken simultaneously upon a chart;

Figure 4 illustrates diagrammatically a typical blood pressure curve as obtained by the plethysmograph;

Figure 5 illustrates diagrammatically the plethysmograph connections to a finger;

Figure 6 illustrates a typical wiring diagram of the oxyhemograph for recording variations in blood oxygenation;

Figure 1:
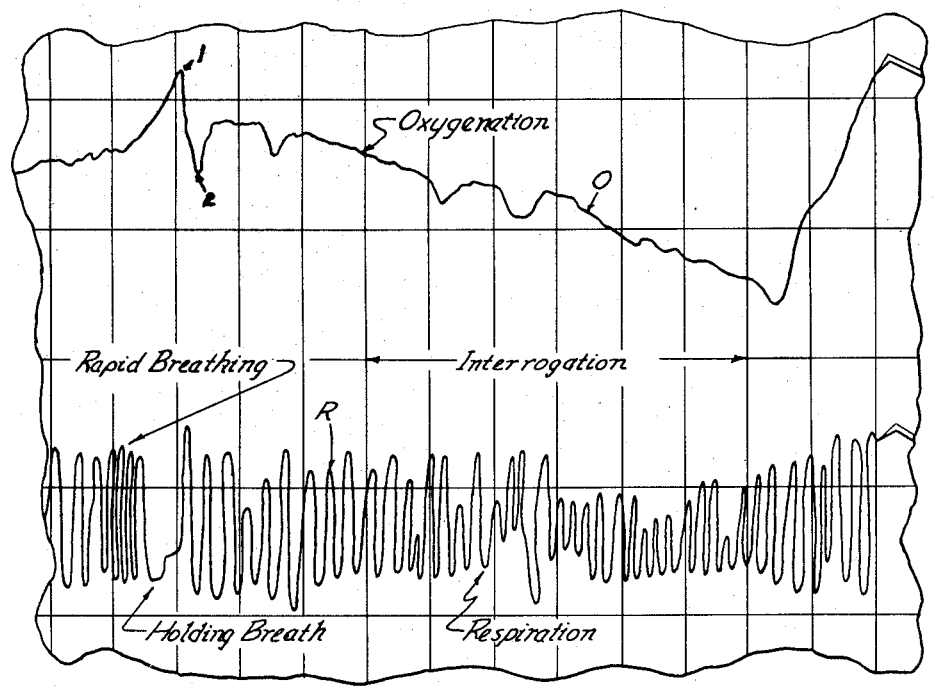
Figure 1 is a diagrammatic view showing a typical comparison of respiration and oxygenation of the blood curves as they appear on the record chart.

In using the system upon a subject it will be appreciated that a respiration belt 10 of known type, will be applied around the chest of the subject. An oxyhemograph 11 will be applied to the ear of the subject. The oxyhemograph comprises a lamp 12, and two photo-electric cells 13 and 14, one with a red filter and the other with an infra red filter. The photo-electric cells 13 and 14, and the lamp 12, are mounted in the oxyhemograph 11 in such a manner that when the device is applied to the pinna of the ear as shown in Figure 3, the lamp 12 is positioned on one side of the pinna and the photo-electric cells 13 and 14 are positioned at the other side thereof. Current is supplied from a suitable source to the lamp 12, and the cells 13 and 14 are activated by light passing through the tissue from the lamp 12. Since one of the cells is provided with a red filter and the other with an infra red filter, the two cells respond differentially to light from the lamp 12. The output of each cell 13 and 14 is connected to a differentiating circuit, as shown in Figure 6, which includes a vibrator 15, a transformer 15a, an amplifier 16, and a rectifier 16a. The differentiating circuit operates a recorder device. Since oxyhemographs and the indicating circuits therefor are known, no detailed showing or description is made herein. Since the two cells respond differentially to the light from the lamp 12, the indications therefrom are functions of the color of the blood in the pinna of the ear. Changes in coloration of the blood are detected and indicated by the recorder. As hereinbefore described, the color of the blood is a function of a percentage of oxygen therein, and thus the oxyhemograph indicates changes in oxygen percentage of the blood.

Two electrical plethysmographs 20 and 21 are applied to one arm of the subject, as shown. The upper plethysmograph 20 is connected to the upper arm and the lower plethysmograph 21 is connected to a finger on that arm. The plethysmograph 20 is connected to a recorder 22 through an amplifying and filtering circuit 23. The output of the circuit 23 is also connected to an electric switch 24. The plethysmograph 21 is also connected through its amplifying and filtering circuit 25 to the electronic switch 24. The switch 24 is closed by the signal from the circuit 23 and opened by the signal from the circuit 25. The time between closing and opening of the electronic switch 24 is a measure of the pulse wave velocity, that is, the time it took the pulse wave to pass from the plethysmograph 20 to the plethysmograph 21.

Figure 7:
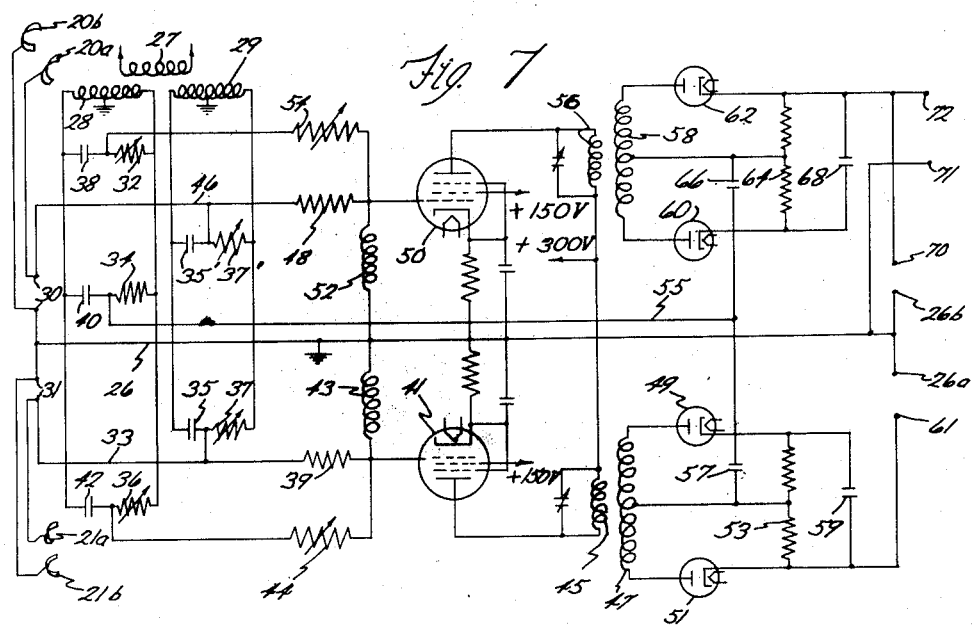
Figures 7 and 8 illustrate a wiring diagram for obtaining the pulse wave velocity curve of Figure 2 from two plethysmographs, one used on the finger and the other on the arm.
Figure 8:
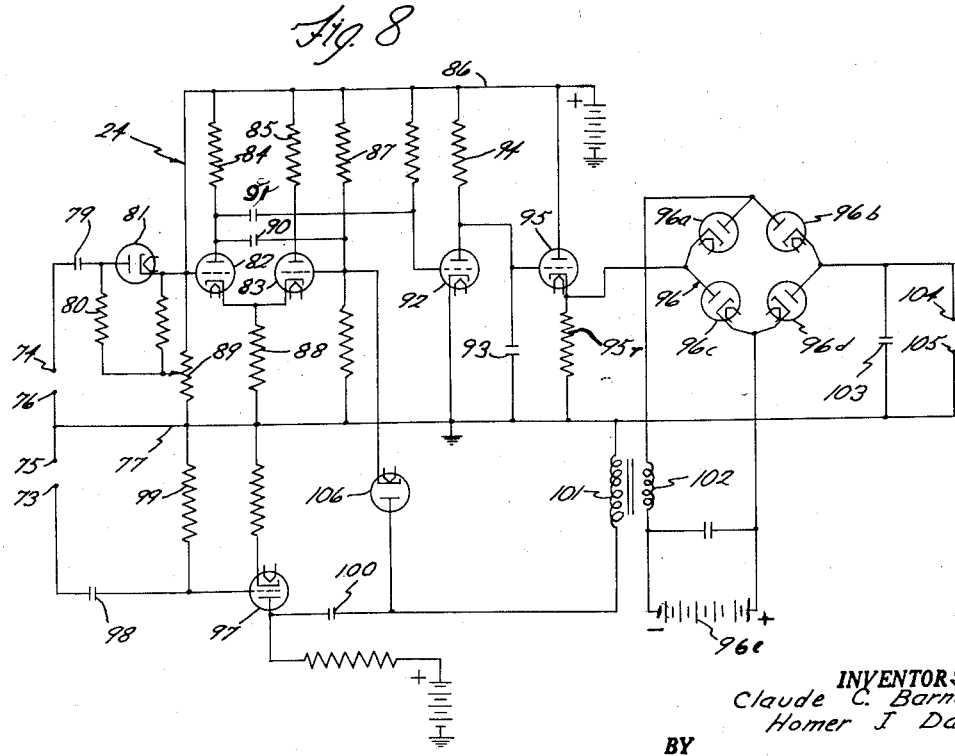

The Figures 7 and 8 show the pulse wave velocity measuring circuit. In this circuit the circuits 23 and 25 are shown together since they use a common radio frequency oscillator to put a radio frequency voltage across a segment of the arm and across a segment of the finger of the subject. The electrodes 20a and 20b of the plethysmograph 20 connect to the input terminals 30 of the circuit 23. The electrodes 21a and 21b of the plethysmograph 21 connect to the input terminals 31 of the circuit 25. A source of radio frequency voltage is connected to a transformer primary coil 27 which has two like center grounded secondary coils 28 and 29. The finger plethysmograph 21 which is used to make a blood pressure recording, is connected through the terminals 31 to a grounded conductor 26 and to a phase shifting network by a conductor 33. The phase shifting network comprises a condenser 35 and variable resistance 37 and another condenser 35' and variable resistance 37', each set being connected in series across the secondary coil 29. The common point of condenser 35 and resistance 37 connects to conductor 33. The conductor 33 is also connected through a resistance 39 to the control grid of a pentode tube 41. The control grid of the tube 41 is also grounded through an impedance 43 to the conductor 26.

The secondary coil 28 feeds into another phase shifting network comprising variable resistances 32, 34 and 36 and condensers 38, 40 and 42. This network is connected through a variable resistance 44 to the control grid of the pentode tube 41. Thus two substantially equal voltages, adjusted by the phase shifting networks to be 180 degrees out of phase with each other are applied to the same control grid of the pentode tube 41. However, the voltage from the phase shifter connected to the secondary coil 29 is shunted to ground wire 26 through the conductor 33 and the electrodes 21a and 21b. The impedance of this shunt varies with the change in blood volume between the electrodes 21a and 21b caused by each heart beat. This variation in impedance, therefore, modulates the oscillator voltage supplied through the phase shifting network from the secondary coil 28 to the control grid of the tube 41. Since the voltages through the resistance 39 and the resistance 44 cancel each other with respect to the grid of the tube 41, this grid, in effect, receives only the modulated radio frequency caused by the changing impedance of the finger of the subject between the electrodes 21a and 21b.

The tube 41 amplifies the resulting modulated radio frequency and applies it to the tuned primary coil 45 of a transformer which has its center tapped secondary coil 47 connected through two rectifier diode tubes 49 and 51 to a center tapped resistance 53. A reference voltage derived from the phase shifting network resistance-condenser pair 34—40 is applied over a conductor 55 through a condenser 57 to the center terminals of the secondary coil 47 and the resistance 53, and alternately adds to or subtracts from the modulated voltage. The resultant demodulated cardiac frequency voltage at condenser 59 is applied to a terminal 61 that in turn is connected to the electronic switch 24.

The arm plethysmograph 20 is connected through the terminals 30 to the grounded conductor 26 and to the phase shifting network that is connected to transformer secondary coil 29. The connection is by a conductor 46 which is connected to the common point of the condenser 35' and the variable resistance 37'. The conductor 46 is also connected through a resistance 48 to the control grid of a pentode tube 50. The control grid of the tube 50 is also grounded through an impedance 52 to the conductor 26.

The control grid of the tube 50 is also connected to the common point of the variable resistance 32 and the condenser 38 of the phase shifting network that is connected to transformer secondary coil 28. This connection is through a variable resistance 54. Thus the variations in impedance through the conductor 46 and the electrodes 20a and 20b due to changes in blood volume between the electrodes 20a and 20b modulate the oscillator voltage supplied through the phase shifting network from the coil 29 to the control grid of the tube 50.

The tube 50 amplifies the resulting modulated radio frequency and applies it to the tuned primary coil 56 of a transformer having a center tapped secondary coil 58. The circuit from the secondary coil 58 to a terminal 70 that is connected to the switch 24 is through a network comprising diodes 60, and 62, center tapped resistance 64 and condenser 68, with the reference voltage applied from conductor 55 through a condenser 66. This network applies the cardiac frequency voltage resulting from impedance changes across electrodes 20a and 20b to terminal 70 in the same manner that the cardiac frequency voltage resulting from impedance changes across electrodes 21a and 21b is applied to terminal 61.

Terminals 71 and 72 are connected to a plethysmograph recorder. The electrodes 20a and 20b thus also serve to supply the necessary blood pressure variation readings so that a blood pressure cuff is not needed.

The electronic switch 24 has terminals 73 and 74 for connection to terminals 61 and 70 respectively. It also has terminals 75 and 76 connecting grounded conductor 77 to terminals 26a and 26b of grounded conductor 26. The details of the electronic switch 24 will now be described. This switch acts as a pulse wave timer in the manner described below.

The pulse signal from the arm plethysmograph applied to input terminals 74—76 of the pulse wave timer 24 is differentiated by the short-time-constant network 79 and 80 and the positive pulse corresponding to the beginning of the pressure pulse in the arm is passed by the diode 81 to trigger a monostable multivibrator comprising two triodes 82 and 83 receiving positive plate current through resistances 84 and 85 from a conductor 86. In this state, a positive grid-return 87 normally keeps triode 83 conducting heavily, producing a positive voltage at the top of resistance 88 which keeps triode 82 cut off. A potentiometer 89 is set low so this can occur, but positive enough so the positive pulse from the arm plethysmograph on terminal 74 can overcome the bias and cause triode 82 momentarily to conduct. When this occurs, the negative-going pulse of the plate of the triode 82 is coupled through a condenser 90 to the grid of the triode 83, cutting it off. The time constant of the condenser 90, and the resistance 87 is such as to keep the multivibrator in this state for about one second.

The negative going wave at the plate of the triode 82 is coupled by another condenser 91 to the grid of a triode 92, cutting it off, allowing a condenser 93 to begin charging through a resistance 94. The rising voltage across the condenser 93 is fed to the grid of a triode 95 which through its cathode is connected to a bi-directional switch 96. This switch normally is left non-conducting by bias potential from a battery 96e. The switch 96 is composed of diodes 96a, 96b, 96c and 96d.

The pulse from the finger plethysmograph 21 arrives at input terminal 73 after condenser 93 starts charging. This pulse is coupled to a triode 97 by a short-time constant network 98—99 and is amplified by the triode 97, and the negative going pulse from the plate of the triode 97 is applied through a condenser 100 to a transformer primary 101. This pulse is inductively coupled to the transformer secondary 102 and subtracts from the bias potential of the battery 96e so as to produce a potential of the opposite polarity and allow the bi-directional switch 96 to conduct momentarily.

During this short conduction time (which occurs at the time the pulse reaches the finger) a condenser 103 charges, or discharges, to the voltage appearing across cathode resistor 95r. But this is the voltage that condenser 93 has charged up to during the time since the pulse wave reached the arm and triggered the timing circuit. Furthermore this voltage is proportional to the elapsed time between the arm pulse and the finger pulse and hence is inversely proportional to the pulse velocity. This potential appears across terminals 104—105 and is recorded to give a continuous indication of the pulse wave velocity and reveals any changes which take place.

The circuit is restored to its original normal state by the positive flyback pulse from transformer primary 101, which is passed by a diode 106 to the grid of triode 83 causing it to conduct, thus cutting off triode 82. The triode 92 then becomes conductive, and discharges condenser 93, thus restoring the circuit ready to measure the next time interval between the arm pulse and the finger pulse.

Referring now to the drawings and to Figure 3 in particular, this figure shows, diagrammatically, an example of recordings taken in the examination of a subject. The respiration belt 10 is connected to a detector 10a which feeds an amplifier 10b that is connected to a recording stylus 10c. The stylus 10c marks a typical respiration curve R on the chart 18. The oxyhemograph 11 attached to the ear of the subject supplies the difference in the potentials generated by the photoelectric cells 13 and 14 when they are subjected to the light from the lamp 12 through their respective filters, to a vibrator 15 and transformer 15a. The output fo the transformer 15a is amplified by the amplifier 16 and rectified by a rectifier 16a to supply direct current to the recording stylus 17. (See Figure 6.)

The characteristic curves shown in Figure 1 of the drawings illustrate the effect on the oxygenation curve when the subject holds the breath and when the interrogation that causes emotional stress takes place. The first part of the oxygenation curve O shows how rapid breathing builds up the oxygen in the blood. Then holding the breath causes sudden drops in the oxygen content of the blood as indicated at 1 and 2 in Figure 1. There is a lag between the respiration change and the change in the oxygen content of the blood. In the interrogation period shown, it will be noted that there is no great variation in the respiration curve indicating possible controlled respiration but the emotional stress has resulted in a greater body demand for oxygen, thus depleting the oxygen supply in the blood and causing a substantial drop in the oxyhemograph curve. There is an appreciable lag of the change in oxygen content of the blood behind the interrogation that caused the emotional stress as indicated on the curve O of Figure 1 which reached its lowest point after interrogation stopped.

Figure 2:
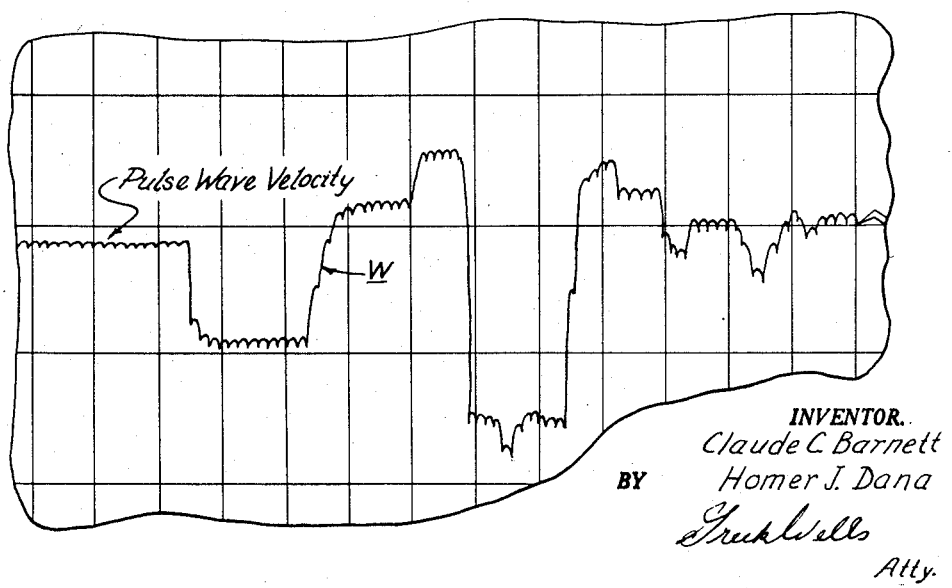
Figure 2 is an enlarged diagrammatic view of the record curves that illustrate variations in pulse wave velocity.

The recorder 22 records the blood pressure curve B from the electrical plethysmograph 20 adjacent to the respiration curve R to provide a comparison of these two curves in the same manner as when they are taken on the known polygraph. The advantages of using the plethysmograph instead of the commonly used blood pressure cuff lie in avoiding discomfort to the subject, false readings due to the effects of the tight cuff upon the subject, and continuous recordings of blood pressure for a much longer time than it would be possible to maintain a cuff tight upon the subject's arm. The plethysmograph 20, in addition, provides part of the information for the pulse wave velocity curve W recorded by the recording stylus 24a. The pulse wave velocity curve W, as shown in Figure 2, is particularly sensitive to emotional stress. Each heart beat causes a pressure wave that travels along the arteries. The velocity of this pressure wave depends in part upon the diameter and elasticity of the blood vessels. Experience has shown that even small emotional responses do cause changes in diameter and elasticity of blood vessels. These changes vary the speed at which a pulse wave travels away from the heart. Quite large percentage changes are found so the continuous curve obtained readily indicates changes in emotional stress.

The recording instrument includes a marker unit M operated by the examiner in order to keep a record that may later be checked. The marker unit is commonly used with known polygraphs. It is therefore only indicated generally in Figure 3 of the drawings.

It is believed that the nature and advantages of our invention will be apparent from the foregoing description.

Having thus described our invention, we claim:

Means for measuring and recording together the variations in blood pressure of a living being and the variations in velocity of pulse waves travelling through a body segment of the living being comprising a plethysmograph applied to the body segment near the heart of the being, a second plethysmograph applied to said body segment at a point more remote from the heart, an electronic switch, means connecting the first plethysmograph to said electronic switch operable to close said switch upon detecting a pulse wave, means connecting the second plethysmograph to said switch operable to open said switch upon detecting said pulse wave after it has travelled between said first plethysmograph and said second plethysmograph, a recorder operably connected to one of said plethysmographs to record the changes in blood pressure indicated thereby, a second recorder operating in timed relation to the first recorder and circuit means connecting the second recorder to said electronic switch operable to actuate said second recorder to record variations in length of time the switch is closed during successive manipulations of the switch.

References Cited in the file of this patent

UNITED STATES PATENTS

| | | |
|---|---|---|
| 2,229,324 | Gordon | Jan. 21, 1941 |
| 2,235,894 | Lee | Mar. 25, 1941 |
| 2,640,389 | Liston | June 2, 1953 |
| 2,657,683 | Koller | Nov. 3, 1953 |
| 2,658,505 | Sheer | Nov. 10, 1953 |
| 2,754,819 | Kirschbaum | July 17, 1956 |